July 8, 1930.    R. T. WISE    1,770,290
TRANSMISSION CLUTCH
Filed Aug. 1, 1928

INVENTOR.
Roy T. Wise.
BY Townsend, Loftus & Abbett
ATTORNEYS.

Patented July 8, 1930

1,770,290

UNITED STATES PATENT OFFICE

ROY T. WISE, OF BERKELEY, CALIFORNIA, ASSIGNOR, BY MESNE ASSIGNMENTS, TO WISE PATENT AND DEVELOPMENT COMPANY, OF NEW YORK, N. Y., A CORPORATION OF DELAWARE

TRANSMISSION CLUTCH

Application filed August 1, 1928. Serial No. 296,659.

This invention relates to clutch mechanisms particularly adapted for use in transmissions, wherein the gears are in constant mesh for forming driving connections between the gears and other driving elements.

It is the principal object of the present invention to provide a generally improved and simplified clutch mechanism of the type referred to wherein wear is automatically compensated for and which will positively and efficiently operate for a maximum period of time without adjustments, repairs or replacements.

In carrying out the invention into practice, the gear or element to be driven is formed with an enlarged bore concentric to the shaft to which it is to be clutched. Within this bore is an expansible clutch member adapted to be expanded by radially movable clutch elements carried by the shaft. An operating member is provided for operating the clutch elements to expand the clutch member into driving engagement with the gear or element or to release said engagement.

One form which the invention may assume is exemplified in the following description and illustrated by way of example in the accompanying drawings in which.

Figure 1:
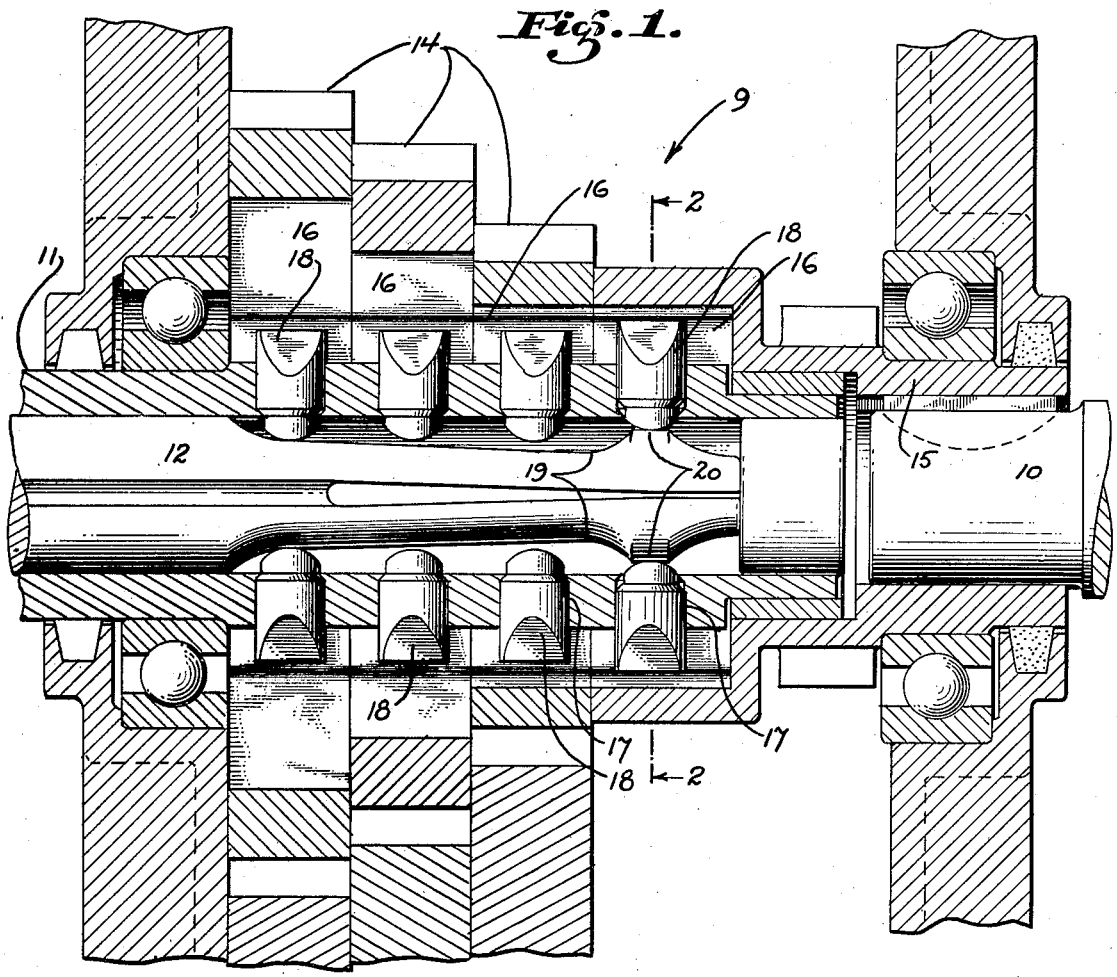
Fig. 1 is a fragmentary view in central longitudinal section through a transmission mechanism disclosing clutches constructed in accordance with my invention assembled in connection therewith.

Referring more particularly to the accompanying drawings, wherein one application of the clutch is shown for purposes of illustration, 9 indicates a portion of the transmission mechanism such as disclosed in my copending application entitled "Constant mesh gear electric motor transmission", filed June 6, 1928, Serial No. 283,248. It is, of course, understood that this improved clutch is capable of general application and not limited in any way to the specific transmission mechanism referred to and disclosed herein. This transmission includes a driving shaft 10 from the prime mover and a driven shaft 11 which is arranged in axial alignment with the driving shaft. The driven shaft 11 is hollow and a clutch operating shaft 12 is reciprocably mounted therein. The driven shaft 11 and the clutch operating shaft 12 revolve in unison although the clutch operating shaft is adapted to slide within the driven shaft so that the various clutches may be operated.

Mounted on the driven shaft 11 is a plurality of the gears 14 which are arranged closely adjacent to each other as illustrated. These gears are driven by other gears of the transmission to transmit a drive to the driven shaft. For the purpose of driving the driven shaft directly from drive shaft 10, I provide sleeve 15 which is keyed to the driving shaft at one end and rotatably mounted on the driven shaft at its other end. The sleeve 15 and the gears 14 are each formed with an enlarged bore which is of a diameter considerably greater than the exterior diameter of the driven shaft 11 and disposed concentric with the shaft 11.

It should be stated that the clutches for forming driving connections between the elements 14 and 15 and the driven shaft 11 are all identical in construction and operation, and therefore the construction and operation of but one will be described.

Figure 2:
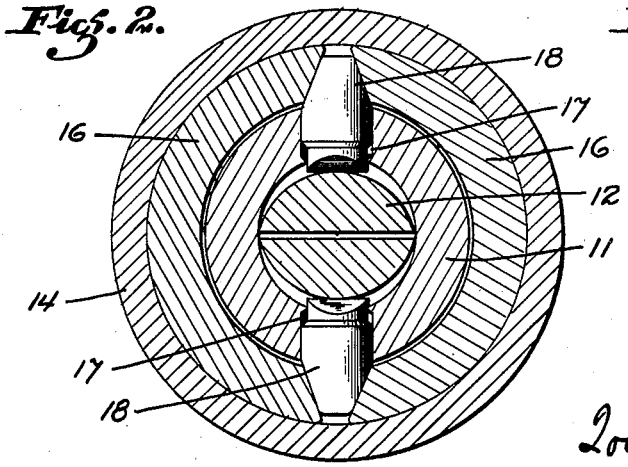
Fig. 2 is a central transverse section through the clutch mechanism taken on line 2—2 of Fig. 1.
Figure 3:
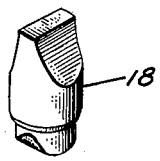
Fig. 3 is a perspective view of one of the clutch elements.

Reference being had to Fig. 2 it is seen that within the enlarged bore of the gear 14 is a pair of clutch shoes 16 which are substantially semi-circular with their exterior surfaces formed on a radius substantially the same as the bore of the gear. The radius upon which the inner bases of the shoes 16 are formed is just slightly greater than the exterior diameter of the driven shaft 11 so that the shoes 16 will be rotatably disposed intermediate driven shaft 11 and the gear 14.

The adjacent ends of the shoes 16 are spaced apart and tapered at an angle not substantially in excess of 30° and perferably less, so that they will converge outwardly to form tapered sockets intermediate the ends of the shoes. In alignment with these sockets, which are disposed at diametrically opposite points, the driven shaft 11 is formed with drilled recesses 17. The diameter of these recesses is reduced at their inner ends for a purpose which will be described.

Reciprocably disposed in each recess 17 is a clutch element 18 having a cylindrical body portion snugly fitting within the recess. The inner end of the clutch element is reduced in diameter so that it may project through the inner end of the recess to a point within the driven shaft 11. The outer end of the clutch element 18 is tapered and projects between the adjacent ends of the clutch shoes 16. The taper of the outer end of the clutch element 18 coincides with the taper of the socket between the ends of the clutch shoes 16 so that the end of the clutch element will engage the ends of the clutch shoes as illustrated. The slight taper on the outer ends of the clutch elements 18 is provided so as to diminish and reduce to practically nil the transmission of torque stresses radially, to divert practically the entire load placed upon the clutch away from the clutch operating shaft 12 and spread it circumferentially of the clutch shoes as will be more fully explained hereinafter.

When the clutch elements 18 are moved outwardly they will expand the shoes 16 into firm frictional engagement with the gear 14 and thereby clutch the gear to the shaft 11. To operate the clutch elements the clutch operating shaft 12 is formed with a reduced portion 19 of a diameter which when aligned with the clutch elements 18 enables the latter to assume positions releasing the shoes 16 from driving engagement with the gear 14. At the end of the reduced portion of the clutch operating shaft the latter is formed with a knob 20, of elliptical cross section, the opposite ends of which slope gradually to smaller diameters to enable the knob to be moved into and out of register with the ends of the clutch elements 18 projecting within the driven shaft 11. It will be noted that the reduced portion 19 is substantially co-extensive with the clutch elements 18 so that when the knob or cam 20 engages the most remote clutch elements 18, the inner ends of the remaining sets of elements 18 will be disposed in the reduced portion and in declutched positions.

When the knob 20 is moved into register with the elements 18 of one of the clutches, the elements 18 will be forced outwardly expanding the clutch shoes 16 into firm frictional engagement with the element it is designed to drive, clutching the latter to the shaft 11. In this position of the parts, it is to be noted that the friction shoe 15 and elements 18 substantially fill the space between the drive and driven members so that there is no possibility of slippage, accidental clutch release, or shearing of the radially movable wedge pins 18.

The end of the clutch operating shaft 12 upon which the knob 20 is formed is longitudinally slotted on the major axis of said elliptical knob and extending substantially the entire length of the reduced portion so that it is rendered resiliently yieldable and can be slightly compressed. The inherent spring qualities of the metal will cause the end of the shaft to constantly seek to expand when compressed and therefore the clutch elements will be yieldingly pressed into engagement with the shoe 16. When the cam head 20 is engaged with the clutch elements 18 to hold the clutch engaged, the two spring arms formed by slotting the operating shaft 12, are not fully contracted, but are slightly spaced apart as shown in Figure 1. This permits the clutch operating shaft 12 to yieldingly maintain the clutch engaged. This gives a certain flexibility to the clutch operating mechanism essential both to its proper operation and to compensate for wear of the parts. In this connection it should be manifest that should the inner ends of the elements 18, the tapered meeting faces of the shoes and elements, or the outer surfaces of the shoes wear, that such wear will be automatically taken up by the expansion of the clutch operating member 12.

In operation of the device, when it is desired to select any one of the gears 14 for operation or to directly connect the driving shaft 10 to the driven shaft 11, it is only necessary to align the knob 20 on the clutch operating shaft 12 with the clutch of the selected gear 14 or the sleeve 15. As has been previously pointed out, when the knob 20 is placed in register with the clutch it will move the clutch elements 18 outwardly. This movement of the clutch elements 18 will impart compound forces acting radially and circumferentially against the shoes 16 to spread them apart and expand the shoes circumferentially due to their resilience into firm frictional engagement with the element within which they are mounted. Thus a driving connection will be formed between the driven element and the shaft 11. When the knob 20 is moved out of register with the elements 18 of the clutch, the tendency of the shoes seeking to return to their unexpanded positions will act through the tapered surfaces between the shoes and the clutch elements 18 to cause the clutch elements to move inwardly releasing the shoes 16 from engagement with the element with which they are associated. The inward movement of the clutch elements 18 is limited by engagement of the larger portions of the clutch elements with the annular shoulders at the inner ends of the recesses 17.

It is to be particularly noted when the clutch is engaged, that the clutch shoes 16 and radially movable wedge pins 18 substantially fill the space between the shaft 11 and outer member 14 so that the shoes chuck up or support the pins from both sides and prevent torque or reaction of the load from shearing these pins. Moreover, this arrangement causes the torque to act circumferentially of the clutch shoes and only in the slightest degree, radially through the wedge pins, due to the acute angle on the wedge pin faces, so that the clutch operating shaft 12 can be made yieldable automatically to compensate for wear and to ably sustain what little stresses of torque that are transmitted radially and in this manner prevent the clutch from slipping and becoming disengaged. This type of friction clutch which practically eliminates radial thrusts of torque, plays an extremely vital part in the combination of elements and permits of the use of the simplest form of clutch actuating shaft possessing inherent resilient yieldability, which in turn automatically compensates for any wear occurring between the parts.

It is desired to point out that the wear between the clutching surfaces will be very slight due to the fact that a large area of clutching surface is provided.

It will be noticed that the clutching surface is comparatively large in diameter and extends for the full width of the gear. Also by use of the clutch here disclosed gears in the transmission may be assembled side by side so that a maximum number of gears may be assembled within a minimum of space.

In the present application I have described the clutch as pertaining to a gear transmission; however, I do not limit myself to this use because the clutch is applicable for use in any circumstance requiring a clutching action between two elements revolving concentrically. While I have shown the preferred form of my invention it is to be understood that various changes may be made in its construction without departing from the spirit of the invention as defined in the appended claims.

Having thus described my invention, what I claim and desire to secure by Letters Patent is:

1. A clutch comprising an inner member, an outer member, said members being adapted to revolve concentrcally, expensible clutch means within the outer member and normally rotatable relative thereto, said clutch means being capable of being expanded into driving connection with the outer member, radially movable clutch elements carried by the inner member and capable of expanding the clutch means to place the same in driving engagement with the outer member, said clutch elements, clutch means and inner member being relatively non-rotatable, and means mounted substantially in the axis of said inner member for yieldingly moving the clutch elements radially outward to expand the clutch means.

2. A clutch comprising an inner and an outer member adapted to revolve concentrically, segmental expansible clutch shoes associated with the outer member and normally free to rotate relative thereto and capable of being expanded into driving engagement with said outer member, radially movable clutch elements operatively interposed between the segmental clutch shoes to engage adjacent ends thereof and capable of operation to expand the same into driving engagement with the outer member, said clutch elements, clutch means and inner member being relatively non-rotatable, and yielding means movable substantially in the axis of said clutch for yieldingly moving the clutch elements radially outward to expand the clutch shoes.

3. A clutch comprising an inner and an outer member adapted to revolve concentrically, expansible clutch means associated with the outer member and normally free to rotate relative thereto and adapted to be expanded into driving engagement with said other outer member, clutch elements operatively associated with the clutch means and capable of operation to expand the same into driving engagement with the outer member, said clutch elements, clutch means and inner member being relatively non-rotatable, and means mounted substantially in the axis of the clutch for actuating the clutch elements to expand the clutching means and including means for automatically compensating for any wear occurring between the parts.

4. A clutch comprising a shaft, a member arranged thereon to revolve concentrically therewith, clutch shoes disposed within the member around the shaft, the spaces between the shoes forming sockets converging outwardly, clutch elements projecting radially from the shaft and having tapered ends fitting the sockets, said elements being movable radially of the shaft and adapted upon outward movement to move the shoes into driving engagement with the member, the action of said shoes acting through the tapered surfaces between the shoes and elements causing the elements to move inwardly, said shaft being hollow, the inner ends of said elements projecting within the shaft, and means operating in the shaft to engage the elements to move them outwardly and including means for automatically compensating for wear between the parts.

5. A clutch comprising an inner member, an outer member, said members being adapted to revolve concentrically, segmental and expansible clutch shoes associated with the outer member and normally free to revolve relative thereto but capable of being expanded into driving engagement therewith, clutch elements carried by the inner member and projecting between the adjacent ends of the clutch shoes, coacting tapered faces on the clutch shoes and on the clutch elements whereby outward radial movement of the clutch elements will cause expansion of the clutch shoes, yielding means engaging said clutch elements and operative to yieldingly move said clutch elements radially outward to engage the clutch, the tendency of said clutch shoes to return to released position acting through the tapered faces to return the clutch elements to released position when the latter are disengaged from the clutch element actuating means.

6. A clutch comprising a shaft, a member arranged thereon to revolve concentrically therewith, clutch shoes disposed within the member around the shaft, the spaces between the shoes forming sockets converging outwardly, clutch elements projecting radially from the shaft and having tapered ends fitting the sockets, said elements being movable radially of the shaft and capable upon outward movement to move the shoes into driving engagement with the member, the action of said shoes acting through the tapered surfaces between the shoes and elements causing the shoes to disengage from the member when the elements move inwardly, said shaft being hollow, the inner ends of said elements projecting within the shaft, an operating member extending within the shaft and reciprocable therethrough, said member capable of yielding slightly in a direction parallel to the axis of movement of the clutch elements, said member having a cam surface formed thereon adapted to be placed in register with the clutch elements to yieldinlgy move the same radially outward to engage the clutch.

7. In a friction clutch, clutch actuating means mounted substantially in the axis of rotation of said clutch, said clutch including means for substantially eliminating transmission of torque thrusts to said clutch actuating means, and said clutch actuating means having a portion thereof removed to render a remaining portion thereof normally inherently yieldable to automatically compensate for wear between the clutch parts.

8. In a friction clutch, clutch actuating means mounted substantially in the axis of rotation of said clutch, said clutch including means for substantially eliminating transmission of torque thrusts to said clutch actuating means, and said actuating means being slotted to render it normally yieldable.

9. In a friction clutch, a hollow shaft clutch actuating means slidably mounted therein, said clutch including means for substantially eliminating transmission of torque thrusts radially to said clutch actuating means, and said actuating means being slotted to render it normally yieldable to yieldingly maintain the clutch engaged.

10. In a friction clutch, a clutch actuating rod movable axially thereof, said clutch including means for substantially eliminating transmission of torque thrusts to said clutch actuating rod, and said clutch actuating rod being resiliently yieldable and relying solely upon its inherent resilience to maintain the clutch engaged.

11. In a friction clutch, inner and outer members, clutch actuating means mounted in the axis of said members, said clutch including means substantially filling the space between said members and for diminishing transmission of torque thrusts to said clutch actuating means, and said clutch actuating means being yieldable.

12. In a friction clutch, inner and outer members, said inner member comprising a hollow shaft, clutch actuating means mounted in said shaft, said clutch including means substantially filling the space between said members and for diminishing transmission of torque thrusts to said clutch actuating means, and said clutch actuating means being yieldable to automatically compensate for wear between the clutch parts.

13. In a friction clutch, inner and outer members, clutch actuating means mounted substantially in the axis of said members, said clutch including means substantially filling the space between said members and for diminishing transmission of torque thrusts radially to said clutch actuating means, and said clutch actuating means being yieldable to yieldingly maintain the clutch engaged.

14. In a friction clutch, a hollow shaft, clutch actuating means mounted in said shaft, said clutch including means for diminishing transmission of torque thrusts to such clutch actuating means, and said clutch actuating means having a portion thereof removed to render it inherently resiliently yieldable for yieldingly moving said means included by the clutch.

15. In a friction clutch, clutch actuating means mounted substantially in the axis of rotation of the clutch, said clutch including means for diminishing transmission of torque thrusts radially to such clutch actuating means, and said clutch actuating means having a portion thereof removed to render it yieldable for yieldingly sustaining said means included by the clutch in clutch engaging position.

16. In a friction clutch, a hollow shaft, clutch actuating means mounted therein, said clutch including means for diminishing transmission of torque thrusts to such clutch actuating means, and said clutch actuating means being slotted to render it resiliently yieldable.

17. In a friction clutch, a hollow shaft, a clutch actuating rod slidably mounted in said shaft, said clutch including means for diminishing the transmission of torque thrusts radially to said rod, and said clutch actuating rod being slotted to render it yieldable to yieldingly move said last named means.

18. A clutch comprising an inner and an outer member adapted to revolve concentrically, segmental expansible clutch means associated with the outer member and normally free to rotate relative thereto, said clutch means being capable of being expanded into driving engagement with said outer member and substantially filling the space between said members when expanded, clutch elements operatively interposed between the segmental clutch means and capable of operation to expand the same into driving engagement with the outer member, said clutch elements, clutch means and inner member being relatively non-rotatable, and yielding means for yieldably actuating the clutch elements to expand said clutch means.

19. In a friction clutch, inner and outer members, clutch actuating means movably axially of said members, said clutch including means substantially filling the space between said members and for diminishing the transmission of torque thrusts radially to said clutch actuating means, said clutch actuating means being yieldable to yieldingly move said clutch means when moved in either direction.

20. A clutch comprising an inner and an outer member adapted to revolve concentrically, expansible clutch means associated with the outer member and normally free to rotate relative thereto and adapted to be expanded into driving engagement with said outer member, a clutch element operatively associated with the clutch means and adapted to exert radial and circumferential thrusts upon said clutch means to expand the same into driving engagement with the outer member, said clutch element, clutch means and inner member being relatively non-rotatable, and means for actuating the clutch element to expand the clutch means and having a portion removed to render a remaining portion inherently resilient.

21. A clutch comprising an inner and an outer member adapted to revolve concentrically, circumferentially expansible clutch means associated with the outer member and normally free to rotate relative thereto and adapted to be expanded into driving engagement with said outer member, a clutch element operatively associated with the clutch means and capable of operation to expand the same into driving engagement with the outer member, said clutch element, clutch means and inner member being relatively non-rotatable, and means for actuating the clutch element to expand the clutch means and having a portion removed to render a remaining portion inherently resilient for yieldably moving said clutch element when engaged therewith.

22. A clutch comprising an inner and an outer member adapted to revolve concentrically, expansible clutch shoes associated with the outer member and normally free to rotate relative thereto and adapted to be expanded into driving engagement with said outer member, a clutch element operatively associated with the clutch shoes for imparting compound thrusts upon said clutch shoes to expand the same into driving engagement with the outer member, said clutch element, clutch means and inner member being relatively non-rotatable, and slotted resilient means for yieldingly actuating the clutch element to expand said clutch shoes.

23. A clutch comprising a hollow shaft, a member arranged thereon to revolve concentrically therewith, clutch shoes disposed within the member around the shaft, the spaces between the shoes forming sockets converging outwardly, clutch elements projecting radially from the shaft and having tapered ends fitting the sockets, said elements being movable radially of the shaft and adapted upon outward movement to move the shoes into driving engagement with the member, and a sliding clutch actuating rod mounted within said hollow shaft and having a cam yieldably supporting said elements when engaged therewith.

24. A clutch comprising a hollow shaft, a member arranged thereon to revolve concentrically therewith, clutch shoes disposed within the member around the shaft, the spaces between the shoes forming sockets converging outwardly, clutch elements projecting radially from the shaft and having ends tapered to an angle of approximately 20° and fitting the sockets, said elements being movable radially of the shaft and adapted upon outward movement to move the shoes into driving engagement with the member, and a sliding clutch actuating rod mounted within said hollow shaft and having a yieldable cam surface for engagement with said elements.

25. A clutch comprising a hollow shaft, a member arranged thereon to revolve concentrically therewith, clutch shoes disposed within the member around the shaft, the spaces between the shoes forming sockets converging outwardly, clutch elements projecting radially from the shaft and having tapered ends fitting the sockets, said elements being movable radially of the shaft and adapted upon outward movement to move the shoes into driving engagement with the member, and a clutch operating rod in said shaft and having a cam portion for engagement with said elements to move them outwardly, said cam portion having a portion thereof removed to render a remaining portion inherently resiliently yieldable.

26. A clutch comprising a hollow shaft, a member arranged thereon to revolve concentrically therewith, clutch shoes disposed within the member around the shaft, the spaces between the shoes forming sockets converging outwardly, clutch elements projecting radially from the shaft and having tapered ends fitting the sockets, said elements being movable radially of the shaft and adapted upon outward movement to move the shoes into driving engagement with the member, a clutch actuating rod slidably mounted within said hollow shaft and having a yieldable cam adapted for yielding engagement with said elements.

27. A clutch comprising a hollow shaft, a member arranged thereon to revolve concentrically therewith, clutch shoes disposed within the member around the shaft, the spaces between the shoes forming sockets converging outwardly, clutch elements projecting radially from the shaft and having tapered ends fitting the sockets, said elements being movable radially of the shaft and adapted upon outward movement to move the shoes into driving engagement with the member, and a clutch actuating rod having an enlarged head slotted longitudinally to render it yieldable.

28. As an article of manufacture, a clutch actuating member having major and minor axes, and having a portion removed substantially along its major axis.

29. As an article of manufacture, a clutch actuating member having major and minor axes, and being split substantially longitudinally and substantially parallel to its major axis.

30. As an article of manufacture, a clutch actuating member having an enlarged head provided with major and minor axes, said head having a portion thereof removed substantially along its major axis.

31. As an article of manufacture, a clutch actuating member having an enlarged head, said head having major and minor axes and split substantially longitudinally and substantially parallel to its major axis.

32. As an article of manufacture, a clutch expander comprising an elongated rod having an enlarged head substantially elliptical in cross section and having a portion thereof removed to render it yieldable.

33. As an article of manufacture, a clutch expander comprising an elongated rod having an enlarged head substantially elliptical in cross section and being split longitudinally to render it yieldable.

34. A clutch assembly comprising a clutch shoe structure having a tapered seat between its ends and adapted to rotate, a radially movable clutch shoe operating member, a clutch operating rod mounted substantially in the axis of rotation of said shoe structure, and said rod having a yieldable cam portion for yieldingly moving said radially movable member.

35. A clutch assembly comprising a tubular shaft, a clutch shoe structure having a tapered seat between its ends and adapted to rotate with said shaft, a radially movable clutch shoe operating member, a clutch operating rod slidably mounted in said shaft, and said rod having an enlarged head split to render it inherently yieldable for yieldingly moving said radially movable member.

36. A clutch comprising inner and outer relatively rotatable members, means operatively associated therewith to establish a driving connection between the same, clutch operating means mounted substantially in the axis of said members and adapted to operate said first mentioned means, and said clutch operating means having a portion thereof removed to render a remaining portion inherently resiliently yieldable to yieldably move said first mentioned means.

37. A clutch comprising inner and outer relatively rotatable concentric members, clutch means for establishing a driving connection therebetween, and a clutch operating rod mounted in the axis of said members and adapted to operate said clutch means, said rod being slotted longitudinally to render it inherently yieldable to yieldingly move said clutch means and yieldingly maintain the clutch engaged.

ROY T. WISE.